United States Patent
Zhang et al.

(10) Patent No.: US 10,239,781 B2
(45) Date of Patent: Mar. 26, 2019

(54) HIGH MODULUS GLASS FIBRE COMPOSITION, AND GLASS FIBRE AND COMPOSITE MATERIAL THEREOF

(71) Applicant: JUSHI GROUP CO., LTD., Tongxiang (CN)

(72) Inventors: Yuqiang Zhang, Tongxiang (CN); Guorong Cao, Tongxiang (CN); Lin Zhang, Tongxiang (CN); Wenzhong Xing, Tongxiang (CN)

(73) Assignee: JUSHI GROUP CO., LTD., Tongxiang, Zhejiang (CN)

( * ) Notice: Subject to any disclaimer, the term of this patent is extended or adjusted under 35 U.S.C. 154(b) by 0 days.

(21) Appl. No.: 15/738,563

(22) PCT Filed: Mar. 7, 2016

(86) PCT No.: PCT/CN2016/075780
§ 371 (c)(1),
(2) Date: Dec. 20, 2017

(87) PCT Pub. No.: WO2016/165506
PCT Pub. Date: Oct. 20, 2016

(65) Prior Publication Data
US 2018/0179103 A1  Jun. 28, 2018

(30) Foreign Application Priority Data

Feb. 29, 2016 (CN) .......................... 2016 1 0113362

(51) Int. Cl.
*C03C 13/00* (2006.01)
*C03C 3/095* (2006.01)

(52) U.S. Cl.
CPC .............. *C03C 13/00* (2013.01); *C03C 3/095* (2013.01); *C03C 2213/00* (2013.01)

(58) Field of Classification Search
CPC ....... C03C 13/00; C03C 13/046; C03C 3/087; C03C 3/095
See application file for complete search history.

(56) References Cited

U.S. PATENT DOCUMENTS 3,804,646 A    4/1974  Dumbaugh
2015/0018194 A1  1/2015  Li et al.

FOREIGN PATENT DOCUMENTS

| JP | H035343 A | 1/1991 | |
|---|---|---|---|
| WO | 2014062715 A1 | 4/2014 | |
| WO | WO-2014062715 A1 * | 4/2014 | ............. C03C 3/095 |
| WO | 2016040425 A1 | 3/2016 | |

OTHER PUBLICATIONS

International Search Report for PCT/CN2016/075780 dated Nov. 25, 2016, and its English translation provided by WIPO.
Written Opinion of the International Search Authority PCT/CN2016/075780 dated Nov. 25, 2016, and its English translation by Bing.Com Microsoft translator.
From JP 2017-564678, Notification of Reasons for Refusal, dated Dec. 11, 2018, with machine English translation from Global Dossier.

* cited by examiner

*Primary Examiner* — Elizabeth A. Bolden
(74) *Attorney, Agent, or Firm* — Ladas & Parry, LLP

(57) ABSTRACT

The present invention provides a high-modulus glass fiber composition, a glass fiber and a composite material therefrom. The glass fiber composition comprises the following components expressed as percentage by weight: 55-64% $SiO_2$, 13-24% $Al_2O_3$, 0.1-6% $Y_2O_3$, 3.4-10.9% CaO, 8-14% MgO, lower than 22% CaO+MgO+SrO, lower than 2% $Li_2O+Na_2O+K_2O$, lower than 2% $TiO_2$, lower than 1.5% $Fe_2O_3$, 0-1.2% $La_2O_3$, wherein the range of the weight percentage ratio $C1=(Li_2O+Na_2O+K_2O)/(Y_2O_3+La_2O_3)$ is greater than 0.26. Said composition can significantly increase the glass elastic modulus, effectively inhibit the crystallization tendency of glass, decrease the liquidus temperature, secure a desirable temperature range (ΔT) for fiber formation and enhance the fining of molten glass, thus making it particularly suitable for production of high-modulus glass fiber with refractory-lined furnaces.

20 Claims, No Drawings

HIGH MODULUS GLASS FIBRE COMPOSITION, AND GLASS FIBRE AND COMPOSITE MATERIAL THEREOF

CROSS REFERENCE TO RELATED APPLICATIONS

This application is the U.S. national phase of PCT Application No. PCT/CN2016/075780 filed on Mar. 7, 2016, which claims the priority of Chinese Patent Application 201610113362.0, filed Feb. 29, 2016 and titled "High Modulus Glass Fibre Composition, and Glass Fibre and Composite Material Thereof", the disclosures of which are incorporated herein by reference in their entireties.

FIELD OF THE INVENTION

The present invention relates to a high-modulus glass fiber composition, specifically to a glass fiber composition that can be used as a reinforcing base material for composites, and to a glass fiber and composite material therefrom.

BACKGROUND FOR THE INVENTION

Glass fiber is an inorganic fiber material that can be used to reinforce resins to produce composite materials with good performance. As a reinforcing base material for advanced composite materials, high-modulus glass fibers were originally used mainly in the aerospace industry or the national defense industry. With the progress of science and technology and the development of economy, high-modulus glass fibers have been widely used in civil and industrial fields such as wind blades, pressure vessels, offshore oil pipes and auto industry.

The original high-modulus glass compositions were based on an $MgO$—$Al_2O_3$—$SiO_2$ system and a typical solution was S-2 glass of American company OC. The modulus of S-2 glass is 89-90 GPa; however, the production of this glass is excessively difficult, as its forming temperature is up to about 1571° C. and its liquidus temperature up to 1470° C. and therefore it is difficult to realize large-scale industrial production. Thus, OC stopped production of S-2 glass fiber and transferred its patent to American company AGY.

Thereafter, OC developed HiPer-tex glass having a modulus of 87-89GP, which were a trade-off for production scale by sacrificing some of the glass properties. However, as the design solution of HiPer-tex glass was just a simple improvement over that of S-2 glass, the forming temperature and liquidus temperature remained high, which causes difficulty in attenuating glass fiber and consequently in realizing large-scale industrial production. Therefore, OC also stopped production of HiPer-tex glass fiber and transferred its patent to the European company 3B.

French company Saint-Gobain developed R glass that is based on an $MgO$—$CaO$—$Al_2O_3$—$SiO_2$ system, and its modulus is 86-89 GPa; however, the total contents of $SiO_2$ and $Al_2O_3$ remain high in the traditional R glass, and there is no effective solution to improve the crystallization performance, as the ratio of Ca to Mg is inappropriately designed, thus causing difficulty in fiber formation as well as a great risk of crystallization, high surface tension and fining difficulty of molten glass. The forming temperature of the R glass reaches 1410° C. and its liquidus temperature up to 1350° C. All these have caused difficulty in effectively attenuating glass fiber and consequently in realizing large-scale industrial production.

In China, Nanjing Fiberglass Research & Design Institute developed an HS2 glass having a modulus of 84-87 GPa. It primarily contains $SiO_2$, $Al_2O_3$ and $MgO$ while also including certain contents of $Li_2O$, $B_2O_3$, $CeO_2$ and $Fe_2O_3$. Its forming temperature is only 1245° C. and its liquidus temperature is 1320° C. Both temperatures are much lower than those of S glass. However, since its forming temperature is lower than its liquidus temperature, which is unfavorable for the control of glass fiber attenuation, the forming temperature has to be increased and specially-shaped tips have to be used to prevent a glass crystallization phenomenon from occurring in the fiber attenuation process. This causes difficulty in temperature control and also makes it difficult to realize large-scale industrial production.

To sum up, we find that, at present stage, the actual production of various high-modulus glass fibers generally faces the difficulty of large-scale production with refractory-lined furnaces, specifically manifested by comparably high liquidus temperature, high rate of crystallization, high forming temperature, high surface tension, fining difficulty of molten glass and a narrow temperature range ($\Delta T$) for fiber formation and even a negative $\Delta T$. Therefore, most companies tend to reduce the production difficulty by compromising some of the glass properties, thus making it impossible to improve the modulus of the above-mentioned glass fibers with the growth of production scale. The problem of an insufficient modulus has long remained unresolved in the production of S glass fiber.

SUMMARY OF THE INVENTION

The present invention aims to solve the issue described above. The purpose of the present invention is to provide a high-modulus glass fiber composition which not only significantly improves the elastic modulus of glass fiber, but also overcomes the technical problems in the manufacture of traditional high-modulus glasses including comparably high liquidus temperature, high crystallization rate, high forming temperature, high surface tension and fining difficulty of molten glass. The said glass fiber composition can significantly reduce the liquidus temperature and forming temperature of high-modulus glasses, help to lower the crystallization rate and bubbling ratio of the glass under the same conditions and achieve a desirable $\Delta T$ value. Therefore, the glass fiber composition according to the present invention is particularly suitable for large-scale production of high-modulus glass fibers with refractory-lined furnaces.

According to one aspect of the present invention, a high-modulus glass fiber composition is provided comprising the following components expressed as percentage by weight:

| | |
|---|---|
| $SiO_2$ | 55-64% |
| $Al_2O_3$ | 13-24% |
| $Y_2O_3$ | 0.1-6% |
| $CaO$ | 3.4-10.9% |
| $MgO$ | 8-14% |
| $CaO + MgO + SrO$ | <22% |
| $Li_2O + Na_2O + K_2O$ | <2% |
| $TiO_2$ | <2% |
| $Fe_2O_3$ | <1.5% |
| $La_2O_3$ | 0-1.2% |

In addition, the weight percentage ratio $C1=(Li_2O+Na_2O+K_2O)/(Y_2O_3+La_2O_3)$ is greater than 0.26.

wherein, the restricted weight percentage ratio $C2=MgO/(CaO+SrO)$ is 0.8-2.1;

Wherein, the said composition comprises the following components expressed as percentage by weight:

| | |
|---|---|
| $SiO_2$ | 56-60.4% |
| $Al_2O_3$ | 13-24% |
| $Y_2O_3$ | 0.1-6% |
| $CaO$ | 3.4-10.9% |
| $MgO$ | 8-14% |
| $CaO + MgO + SrO$ | <22% |
| $SrO$ | <3% |
| $Li_2O + Na_2O + K_2O$ | <2% |
| $TiO_2$ | <2% |
| $Fe_2O_3$ | <1.5% |
| $La_2O_3$ | 0-1.2% |

In addition, the weight percentage ratio $C1=(Li_2O+Na_2O+K_2O)/Y_2O_3$ is greater than 0.26.

wherein, the restricted content range of $Li_2O$ is 0.1-1.5% by weight;

wherein, the restricted content range of $SrO$ is 0.1-2.5% by weight;

wherein, the restricted content range of $CaO$ is 6-10.3% by weight;

wherein, the restricted content range of $MgO$ is 8.6-13% by weight;

wherein, the restricted content range of $Y_2O_3$ is 0.5-5% by weight;

wherein, the restricted content range of $Y_2O_3$ is 1.5-5% by weight;

Wherein, the said composition comprises the following components expressed as percentage by weight:

| | |
|---|---|
| $SiO_2$ | 56-60.4% |
| $Al_2O_3$ | 13-24% |
| $Y_2O_3$ | 0.5-5% |
| $CaO$ | 3.4-10.9% |
| $MgO$ | 8-14% |
| $CaO + MgO + SrO$ | <22% |
| $SrO$ | <3% |
| $Li_2O$ | 0.1-1.5% |
| $Li_2O + Na_2O + K_2O$ | <2% |
| $TiO_2$ | <2% |
| $Fe_2O_3$ | <1.5% |
| $La_2O_3$ | 0-1.2% |

In addition, the weight percentage ratio $C1=(Li_2O+Na_2O+K_2O)/Y_2O_3$ is greater than 0.26, and the weight percentage ratio $C2=MgO/(CaO+SrO)$ is 0.8-2.1.

Wherein, the said composition comprises the following components expressed as percentage by weight:

| | |
|---|---|
| $SiO_2$ | 56-60.4% |
| $Al_2O_3$ | 13-24% |
| $Y_2O_3$ | 0.5-5% |
| $CaO$ | 3.4-10.9% |
| $MgO$ | 8-14% |
| $CaO + MgO + SrO$ | <22% |
| $SrO$ | <3% |
| $Li_2O$ | 0.1-1.5% |
| $Li_2O + Na_2O + K_2O$ | <2% |
| $TiO_2$ | <2% |
| $Fe_2O_3$ | <1.5% |
| $La_2O_3$ | 0-1.2% |

In addition, the weight percentage ratio $C1=(Li_2O+Na_2O+K_2O)/(Y_2O_3+La_2O_3)$ is greater than 0.28, and the weight percentage ratio $C2=MgO/(CaO+SrO)$ is 0.8-2.1.

Wherein, the said composition comprises the following components expressed as percentage by weight:

| | |
|---|---|
| $SiO_2$ | 57-60.4% |
| $Al_2O_3$ | 14-24% |
| $Y_2O_3$ | 0.5-5% |
| $CaO$ | 5-10.6% |
| $MgO$ | 8-14% |
| $CaO + MgO + SrO$ | <21% |
| $SrO$ | <3% |
| $Li_2O$ | 0.1-1% |
| $Li_2O + Na_2O + K_2O$ | <2% |
| $TiO_2$ | <2% |
| $Fe_2O_3$ | <1.5% |
| $La_2O_3$ | 0-1.2% |

In addition, the weight percentage ratio $C1=(Li_2O+Na_2O+K_2O)/(Y_2O_3+La_2O_3)$ is greater than 0.28, and the weight percentage ratio $C2=MgO/(CaO+SrO)$ is 0.8-2.1.

Wherein, the said composition comprises the following components expressed as percentage by weight:

| | |
|---|---|
| $SiO_2$ | 57-60.4% |
| $Al_2O_3$ | 14-23% |
| $Y_2O_3$ | 1.5-5% |
| $CaO$ | 6-10.3% |
| $MgO$ | 8.6-13% |
| $CaO + MgO + SrO$ | <21% |
| $SrO$ | <3% |
| $Li_2O$ | 0.1-1% |
| $Li_2O + Na_2O + K_2O$ | <2% |
| $TiO_2$ | <2% |
| $Fe_2O_3$ | <1.5% |
| $La_2O_3$ | 0-1.2% |

In addition, the weight percentage ratio $C1=(Li_2O+Na_2O+K_2O)/(Y_2O_3+La_2O_3)$ is greater than 0.29, and the weight percentage ratio $C2=MgO/(CaO+SrO)$ is 0.9-1.8.

Wherein, the said composition comprises the following components expressed as percentage by weight:

| | |
|---|---|
| $SiO_2$ | 57-60.4% |
| $Al_2O_3$ | 14-23% |
| $Y_2O_3$ | 1.5-5% |
| $CaO$ | 6-10.3% |
| $MgO$ | 8.6-13% |
| $CaO + MgO + SrO$ | <21% |
| $SrO$ | <3% |
| $Li_2O$ | 0.1-1% |
| $Li_2O + Na_2O + K_2O$ | <2% |
| $TiO_2$ | <2% |
| $Fe_2O_3$ | <1.5% |
| $La_2O_3$ | 0-1.2% |

In addition, the weight percentage ratio $C1=(Li_2O+Na_2O+K_2O)/(Y_2O_3+La_2O_3)$ is greater than 0.29, and the weight percentage ratio $C2=MgO/(CaO+SrO)$ is 0.9-1.7.

wherein, the restricted content range of $SrO$ is 0.1-2% by weight;

wherein, the restricted content range of $La_2O_3$ is 0.1-1% by weight;

wherein, the restricted content range of $Y_2O_3$ is 2-4% by weight;

wherein, the restricted content range of $CaO$ is 6.5-10% by weight;

wherein, the restricted content range of $MgO$ is greater than 12% but not greater than 13% by weight;

Wherein, the said composition comprises the following components expressed as percentage by weight:

| | |
|---|---|
| SiO$_2$ | 55-64% |
| Al$_2$O$_3$ | 13-24% |
| Y$_2$O$_3$ | 0.1-6% |
| CaO | 3.4-10.9% |
| MgO | greater than 12% but not greater than 13% |
| CaO + MgO + SrO | <22% |
| Li$_2$O + Na$_2$O + K$_2$O | <2% |
| TiO$_2$ | <2% |
| Fe$_2$O$_3$ | <1.5% |
| La$_2$O$_3$ | 0-1.2% |

In addition, the weight percentage ratio C1=(Li$_2$O+Na$_2$O+K$_2$O)/(Y$_2$O$_3$+La$_2$O$_3$) is greater than 0.26.

Wherein, the said composition comprises the following components expressed as percentage by weight:

| | |
|---|---|
| SiO$_2$ | 55-64% |
| Al$_2$O$_3$ | greater than 19% but not greater than 21% |
| Y$_2$O$_3$ | 0.1-6% |
| CaO | 3.4-10.9% |
| MgO | 8-10.5% |
| CaO + MgO + SrO | <22% |
| Li$_2$O + Na$_2$O + K$_2$O | <1% |
| TiO$_2$ | <2% |
| Fe$_2$O$_3$ | <1.5% |
| La$_2$O$_3$ | 0-1.2% |

In addition, the weight percentage ratio C1=(Li$_2$O+Na$_2$O+K$_2$O)/(Y$_2$O$_3$+La$_2$O$_3$) is greater than 0.26.

Wherein, the said composition can also include CeO$_2$ with a content range of 0-1% in percentage by weight.

According to another aspect of this invention, a glass fiber produced with said glass fiber composition is provided.

Wherein, the elastic modulus of said glass fiber is 90-103 GPa.

According to yet another aspect of this invention, a composite material incorporating said glass fiber is provided.

The main inventive points of the glass fiber composition according to this invention include: introducing the rare earth oxide Y$_2$O$_3$, utilizing the special compensation effect of yttrium in the glass structure, controlling the ratios of (Li$_2$O+Na$_2$O+K$_2$O)/(Y$_2$O$_3$+La$_2$O$_3$) and MgO/(CaO+SrO) respectively, reasonably configuring the content ranges of Y$_2$O$_3$, La$_2$O$_3$, Li$_2$O, SrO, CaO, MgO and CaO+MgO+SrO, utilizing the synergistic effect of yttrium and alkali metal oxides as well as the mixed alkali earth effect among SrO, CaO and MgO, and a selective introduction of CeO$_2$ at an appropriate amount.

Specifically, the high-modulus glass fiber composition according to the present invention comprises the following components expressed as percentage by weight:

| | |
|---|---|
| SiO$_2$ | 55-64% |
| Al$_2$O$_3$ | 13-24% |
| Y$_2$O$_3$ | 0.1-6% |
| CaO | 3.4-10.9% |
| MgO | 8-14% |
| CaO + MgO + SrO | <22% |
| Li$_2$O + Na$_2$O + K$_2$O | <2% |
| TiO$_2$ | <2% |
| Fe$_2$O$_3$ | <1.5% |
| La$_2$O$_3$ | 0-1.2% |

In addition, the weight percentage ratio C1=(Li$_2$O+Na$_2$O+K$_2$O)/(Y$_2$O$_3$+La$_2$O$_3$) is greater than 0.26.

The effect and content of each component in said glass fiber composition is described as follows:

SiO$_2$ is a main oxide forming the glass network and has the effect of stabilizing all the components. In the glass fiber composition of the present invention, the restricted content range of SiO$_2$ is 55-64%. On the basis of maintaining high mechanical properties and not adding difficulties of fining the molten glass, the present invention specifically keeps the content of silica under a certain level. Preferably, the SiO$_2$ content range can be 56-60.4%, more preferably 57-60.4%.

Al$_2$O$_3$ is another main oxide forming the glass network. When combined with SiO$_2$, it can have a substantive effect on the mechanical properties of the glass and a significant effect on preventing glass phase separation and on water resistance. The restricted content range of Al$_2$O$_3$ in this invention is 13-24%. Too low of an Al$_2$O$_3$ content will make it impossible to obtain sufficiently high mechanical properties, especially modulus; too high of a content will significantly increase the risks of glass phase separation. Preferably, the Al$_2$O$_3$ content can be 14-24%, more preferably 14-23%. In addition, the inventors have unexpectedly found in an embodiment that, when the weight percentage of Al$_2$O$_3$ is controlled to be greater than 19% and not greater than 21%, the weight percentage of MgO not greater than 10.5% and the total weight percentage of Li$_2$O+Na$_2$O+K$_2$O not greater than 1%, the glass can have excellent mechanical properties and crystallization resistance as well as a broad temperature range ($\Delta T$) for fiber formation.

Both K$_2$O and Na$_2$O can reduce glass viscosity and are good fluxing agents. The inventors have found that, replacing Na$_2$O with K$_2$O while keeping the total amount of alkali metal oxides unchanged can reduce the crystallization tendency of glass and improve the fiber forming performance. Compared with Na$_2$O and K$_2$O, Li$_2$O can not only significantly reduce glass viscosity thereby improving the glass melting performance, but also help greatly improve the mechanical properties of glass. In addition, a small amount of Li$_2$O provides considerable free oxygen, which helps more aluminum ions to form tetrahedral coordination, enhances the network structure of the glass and further improves the mechanical properties of glass. However, as too many alkali metal ions in the glass composition would affect the stability of the glass, the introduced amount should be limited. Therefore, in the glass fiber composition of the present invention, the restricted content range of Li$_2$O+Na$_2$O+K$_2$O is lower than 2%. Furthermore, the restricted content range of Li$_2$O is 0.1-1.5%, and preferably 0.1-1%.

Y$_2$O$_3$ is an important rare earth oxide. The inventors find that Y$_2$O$_3$ is particularly effective in increasing the glass modulus and inhibiting the glass crystallization. As it is hard for Y$^{3+}$ to enter the glass network, it usually exists as external ions at the gaps of the glass network. Y$^{3+}$ ions have large coordination numbers, high field strength and electric charge, and high accumulation capability. Due to these features, Y$^{3+}$ ions can help not only to improve the structural stability of the glass and increase the glass modulus, but also effectively prevent the movement and arrangement of other ions so as to minimize the crystallization tendency of the glass. In the glass fiber composition of this invention, the restricted content range of Y$_2$O$_3$ is 0.1-6%. Preferably, the Y$_2$O$_3$ content can be 0.5-5%, more preferably 1.5-5%, and still more preferably 2-4%.

La$_2$O$_3$ is also an important rare earth oxide. The inventors have found that, when used alone, La$_2$O$_3$ shows a weaker effect in increasing the modulus and inhibiting the crystallization but offers a better fining effect, as compared with Y$_2$O$_3$. In the meantime, as the molar mass and ionic radiuses of lanthanum are both big, an excessive introduced amount would not only weaken its effect in increasing the glass properties, but also even undermine the stability of the glass structure and increase the glass density. Therefore, the introduced amount of $La_2O_3$ should be limited. In the glass fiber composition of this invention, $La_2O_3$ can be optionally introduced with a small amount. The restricted content of $La_2O_3$ can be 0-1.2%, and further can be 0.1-1%.

The inventors also find that the coordination state of $Y_2O_3$ is closely related to the content of free oxygen in the glass. $Y_2O_3$ in crystalline state has vacancy defects and, when $Y_2O_3$ are introduced to the glass, these vacancy defects would be filled by other oxides, especially alkali metal oxides. Different filling degrees would lead to different coordination state and stacking density of $Y_2O_3$, thus having a significant effect on the glass properties. Similarly, $La_2O_3$ also needs a certain amount of oxygen to fill the vacancies. In order to acquire sufficient free oxygen and accordingly achieve a more compact stacking structure and better crystallization resistance, the restricted range of the weight percentage ratio $C1=(Li_2O+Na_2O+K_2O)/(Y_2O_3+La_2O_3)$ in the present invention is greater than 0.26, preferably greater than 0.28, and more preferably greater than 0.29.

CaO, MgO and SrO primarily have the effect of controlling the glass crystallization and regulating the glass viscosity and the rate of hardening of molten glass. Particularly on the control of the glass crystallization, the inventors have obtained unexpected effects by controlling the introduced amounts of them and the ratios between them. Generally, for a high-performance glass based on the MgO—CaO—$Al_2O_3$—$SiO_2$ system, the crystal phases it contains after glass crystallization include mainly diopside ($CaMgSi_2O_6$) and anorthite ($CaAl_2Si_2O_8$). In order to effectively inhibit the tendency for two crystal phases to crystallize and decrease the glass liquidus temperature and the rate of crystallization, this invention has rationally controlled the total content of CaO+MgO+SrO and the weight percentage ratio $C2=MgO/(CaO+SrO)$ and utilized the mixed alkali earth effect to form a compact stacking structure, so that more energy are needed for the crystal nucleases to form and grow. In addition, as the radius of $Sr^{2+}$ ions is big, not only the ion itself is difficult to move but also it can retard the movement and restructuring of $Mg^{2+}$ and $Ca^{2+}$ ions under the same conditions, thus achieving the target of inhibiting the crystallization tendency of the glass while optimizing the rate of hardening of molten glass. In the glass fiber composition of this invention, the restricted range of the total content of CaO+MgO+SrO is less than 22%, and preferably less than 21%. Still, in one embodiment of this invention, the restricted range of the weight percentage ratio $C2=MgO/(CaO+SrO)$ can be 0.8-2.1, preferably 0.9-1.8, and more preferably 0.9-1.7; in another embodiment of this invention, when the content of MgO is above 12%, there will be no such restrictions as described above for the range of C2.

In the glass fiber composition of the present invention, the restricted content range of CaO can be 3.4-10.9%, preferably 5-10.6%, more preferably can be 6-10.3%, and still more preferably 6.5-10%; the restricted content range of MgO can be 8-14%, preferably 8.6-13%, and more preferably greater than 12% but not greater than 13%; the restricted content range of SrO can be lower than 3%, preferably 0.1-2.5%, and more preferably 0.1-2%.

$TiO_2$ can not only reduce the glass viscosity at high temperature, but also has a certain fluxing effect. However, since titanium ions have a certain coloring effect and such coloring effect becomes particularly significant when the $TiO_2$ content exceeds 2%, which will affect the appearance of glass fiber reinforced articles to some extent. Therefore, in the glass fiber composition of the present invention, the restricted content range of $TiO_2$ is lower than 2%.

$Fe_2O_3$ facilitates the melting of glass and can also improve the crystallization performance of glass. However, since ferric ions and ferrous ions have a coloring effect, the introduced amount should be limited. Therefore, in the glass fiber composition of the present invention, the restricted content range of $Fe_2O_3$ is lower than 1.5%.

In the glass fiber composition of the present invention, a selective introduction of $CeO_2$ at an appropriate amount can further improve the crystallization tendency and fining of the glass, and the restricted content range of $CeO_2$ can be 0-1%.

In addition, the glass fiber composition of the present invention can include small amounts of other components with a total content not greater than 2%.

In the glass fiber composition of the present invention, the beneficial effects produced by the aforementioned selected ranges of the components will be explained by way of examples through the specific experimental data.

The following are embodiments of preferred content ranges of the components contained in the glass fiber composition according to the present invention.

Preferred Embodiment 1

The high-modulus glass fiber composition according to the present invention comprises the following components expressed as percentage by weight:

| | |
|---|---|
| $SiO_2$ | 56-60.4% |
| $Al_2O_3$ | 13-24% |
| $Y_2O_3$ | 0.5-5% |
| CaO | 3.4-10.9% |
| MgO | 8-14% |
| CaO + MgO + SrO | <22% |
| SrO | <3% |
| $Li_2O$ | 0.1-1.5% |
| $Li_2O + Na_2O + K_2O$ | <2% |
| $TiO_2$ | <2% |
| $Fe_2O_3$ | <1.5% |
| $La_2O_3$ | 0-1.2% |

In addition, the range of the weight percentage ratio $C1=(Li_2O+Na_2O+K_2O)/(Y_2O_3+La_2O_3)$ is greater than 0.26, and the range of the weight percentage ratio $C2=MgO/(CaO+SrO)$ is 0.8-2.1.

Preferred Embodiment 2

The high-modulus glass fiber composition according to the present invention comprises the following components expressed as percentage by weight:

| | |
|---|---|
| $SiO_2$ | 56-60.4% |
| $Al_2O_3$ | 13-24% |
| $Y_2O_3$ | 0.5-5% |
| CaO | 3.4-10.9% |
| MgO | 8-14% |
| CaO + MgO + SrO | <22% |
| SrO | <3% |
| $Li_2O$ | 0.1-1.5% |
| $Li_2O + Na_2O + K_2O$ | <2% |
| $TiO_2$ | <2% |
| $Fe_2O_3$ | <1.5% |
| $La_2O_3$ | 0-1.2% |

In addition, the range of the weight percentage ratio $C1=(Li_2O+Na_2O+K_2O)/(Y_2O_3+La_2O_3)$ is greater than 0.28, and the range of the weight percentage ratio $C2=MgO/(CaO+SrO)$ is 0.8-2.1.

Preferred Embodiment 3

The high-modulus glass fiber composition according to the present invention comprises the following components expressed as percentage by weight:

| | |
|---|---|
| $SiO_2$ | 57-60.4% |
| $Al_2O_3$ | 14-24% |
| $Y_2O_3$ | 0.5-5% |
| CaO | 5-10.6% |
| MgO | 8-14% |
| CaO + MgO + SrO | <21% |
| SrO | <3% |
| $Li_2O$ | 0.1-1% |
| $Li_2O + Na_2O + K_2O$ | <2% |
| $TiO_2$ | <2% |
| $Fe_2O_3$ | <1.5% |
| $La_2O_3$ | 0-1.2% |

In addition, the range of the weight percentage ratio $C1=(Li_2O+Na_2O+K_2O)/(Y_2O_3+La_2O_3)$ is greater than 0.28, and the range of the weight percentage ratio $C2=MgO/(CaO+SrO)$ is 0.8-2.1.

Preferred Embodiment 4

The high-modulus glass fiber composition according to the present invention comprises the following components expressed as percentage by weight:

| | |
|---|---|
| $SiO_2$ | 57-60.4% |
| $Al_2O_3$ | 14-23% |
| $Y_2O_3$ | 1.5-5% |
| CaO | 6-10.3% |
| MgO | 8.6-13% |
| CaO + MgO + SrO | <21% |
| SrO | <3% |
| $Li_2O$ | 0.1-1% |
| $Li_2O + Na_2O + K_2O$ | <2% |
| $TiO_2$ | <2% |
| $Fe_2O_3$ | <1.5% |
| $La_2O_3$ | 0-1.2% |

In addition, the range of the weight percentage ratio $C1=(Li_2O+Na_2O+K_2O)/(Y_2O_3+La_2O_3)$ is greater than 0.29, and the range of the weight percentage ratio $C2=MgO/(CaO+SrO)$ is 0.9-1.8.

Preferred Embodiment 5

The high-modulus glass fiber composition according to the present invention comprises the following components expressed as percentage by weight:

| | |
|---|---|
| $SiO_2$ | 57-60.4% |
| $Al_2O_3$ | 14-23% |
| $Y_2O_3$ | 1.5-5% |
| CaO | 6-10.3% |
| MgO | 8.6-13% |
| CaO + MgO + SrO | <21% |
| SrO | <3% |
| $Li_2O$ | 0.1-1% |
| $Li_2O + Na_2O + K_2O$ | <2% |
| $TiO_2$ | <2% |
| $Fe_2O_3$ | <1.5% |
| $La_2O_3$ | 0-1.2% |

In addition, the range of the weight percentage ratio $C1=(Li_2O+Na_2O+K_2O)/(Y_2O_3+La_2O_3)$ is greater than 0.29, and the range of the weight percentage ratio $C2=MgO/(CaO+SrO)$ is 0.9-1.7.

According to the preferred embodiment 5, the liquidus temperature of the glass composition is not greater than 1320° C. preferably not greater than 1300° C. and more preferably not greater than 1250° C. and the elastic modulus of the glass fiber made thereof is 90-103 Gpa.

Preferred Embodiment 6

The high-modulus glass fiber composition according to the present invention comprises the following components expressed as percentage by weight:

| | |
|---|---|
| $SiO_2$ | 57-60.4% |
| $Al_2O_3$ | 14-23% |
| $Y_2O_3$ | 1.5-5% |
| CaO | 6-10.3% |
| MgO | 8.6-13% |
| CaO + MgO + SrO | <21% |
| SrO | 0.1-2% |
| $Li_2O$ | 0.1-1% |
| $Li_2O + Na_2O + K_2O$ | <2% |
| $TiO_2$ | <2% |
| $Fe_2O_3$ | <1.5% |
| $La_2O_3$ | 0-1.2% |

In addition, the range of the weight percentage ratio $C1=(Li_2O+Na_2O+K_2O)/(Y_2O_3+La_2O_3)$ is greater than 0.29, and the range of the weight percentage ratio $C2=MgO/(CaO+SrO)$ is 0.9-1.7.

Preferred Embodiment 7

The high-modulus glass fiber composition according to the present invention comprises the following components expressed as percentage by weight:

| | |
|---|---|
| $SiO_2$ | 57-60.4% |
| $Al_2O_3$ | 14-24% |
| $Y_2O_3$ | 0.5-5% |
| CaO | 5-10.6% |
| MgO | 8-14% |
| CaO + MgO + SrO | <21% |
| SrO | <3% |
| $Li_2O$ | 0.1-1% |
| $Li_2O + Na_2O + K_2O$ | <2% |
| $TiO_2$ | <2% |
| $Fe_2O_3$ | <1.5% |
| $La_2O_3$ | 0.1-1% |

In addition, the range of the weight percentage ratio $C1=(Li_2O+Na_2O+K_2O)/(Y_2O_3+La_2O_3)$ is greater than 0.28, and the range of the weight percentage ratio $C2=MgO/(CaO+SrO)$ is 0.8-2.1.

Preferred Embodiment 8

The high-modulus glass fiber composition according to the present invention comprises the following components expressed as percentage by weight:

| | |
|---|---|
| SiO$_2$ | 57-60.4% |
| Al$_2$O$_3$ | 14-24% |
| Y$_2$O$_3$ | 2-4% |
| CaO | 5-10.6% |
| MgO | 8-14% |
| CaO + MgO + SrO | <21% |
| SrO | <3% |
| Li$_2$O | 0.1-1% |
| Li$_2$O + Na$_2$O + K$_2$O | <2% |
| TiO$_2$ | <2% |
| Fe$_2$O$_3$ | <1.5% |
| La$_2$O$_3$ | 0-1.2% |

In addition, the range of the weight percentage ratio C1=(Li$_2$O+Na$_2$O+K$_2$O)/(Y$_2$O$_3$+La$_2$O$_3$) is greater than 0.28, and the range of the weight percentage ratio C2=MgO/(CaO+SrO) is 0.8-2.1.

Preferred Embodiment 9

The high-modulus glass fiber composition according to the present invention comprises the following components expressed as percentage by weight:

| | |
|---|---|
| SiO$_2$ | 57-60.4% |
| Al$_2$O$_3$ | 14-24% |
| Y$_2$O$_3$ | 0.5-5% |
| CaO | 6.5-10% |
| MgO | 8-14% |
| CaO + MgO + SrO | <21% |
| SrO | <3% |
| Li$_2$O | 0.1-1% |
| Li$_2$O + Na$_2$O + K$_2$O | <2% |
| TiO$_2$ | <2% |
| Fe$_2$O$_3$ | <1.5% |
| La$_2$O$_3$ | 0-1.2% |

In addition, the range of the weight percentage ratio C1=(Li$_2$O+Na$_2$O+K$_2$O)/(Y$_2$O$_3$+La$_2$O$_3$) is greater than 0.28, and the range of the weight percentage ratio C2=MgO/(CaO+SrO) is 0.8-2.1.

Preferred Embodiment 10

The high-modulus glass fiber composition according to the present invention comprises the following components expressed as percentage by weight:

| | |
|---|---|
| SiO$_2$ | 55-64% |
| Al$_2$O$_3$ | 13-24% |
| Y$_2$O$_3$ | 0.1-6% |
| CaO | 3.4-10.9% |
| MgO | greater than 12% and not greater than 13% |
| CaO + MgO + SrO | <22% |
| Li$_2$O + Na$_2$O + K$_2$O | <2% |
| TiO$_2$ | <2% |
| Fe$_2$O$_3$ | <1.5% |
| La$_2$O$_3$ | 0-1.2% |

In addition, the range of the weight percentage ratio C1=(Li$_2$O+Na$_2$O+K$_2$O)/(Y$_2$O$_3$+La$_2$O$_3$) is greater than 0.26.

According to the preferred embodiment 10, the elastic modulus of the glass fiber made thereof is greater than 95 Gpa.

Preferred Embodiment 11

The high-modulus glass fiber composition according to the present invention comprises the following components expressed as percentage by weight:

| | |
|---|---|
| SiO$_2$ | 55-64% |
| Al$_2$O$_3$ | greater than 19% and not greater than 21% |
| Y$_2$O$_3$ | 0.1-6% |
| CaO | 3.4-10.9% |
| MgO | 8-10.5% |
| CaO + MgO + SrO | <22% |
| Li$_2$O + Na$_2$O + K$_2$O | ≤1% |
| TiO$_2$ | <2% |
| Fe$_2$O$_3$ | <1.5% |
| La$_2$O$_3$ | 0-1.2% |

In addition, the range of the weight percentage ratio C1=(Li$_2$O+Na$_2$O+K$_2$O)/(Y$_2$O$_3$+La$_2$O$_3$) is greater than 0.26.

Preferred Embodiment 12

The high-modulus glass fiber composition according to the present invention comprises the following components expressed as percentage by weight:

| | |
|---|---|
| SiO$_2$ | 57-60.4% |
| Al$_2$O$_3$ | 14-24% |
| Y$_2$O$_3$ | 0.5-5% |
| CaO | 5-10.6% |
| MgO | 8-14% |
| CaO + MgO + SrO | <21% |
| SrO | <3% |
| Li$_2$O | 0.1-1% |
| Li$_2$O + Na$_2$O + K$_2$O | <2% |
| TiO$_2$ | <2% |
| Fe$_2$O$_3$ | <1.5% |
| La$_2$O$_3$ | 0-1.2% |
| CeO$_2$ | 0-1% |

In addition, the range of the weight percentage ratio C1=(Li$_2$O+Na$_2$O+K$_2$O)/(Y$_2$O$_3$+La$_2$O$_3$) is greater than 0.28, and the range of the weight percentage ratio C2=MgO/(CaO+SrO) is 0.8-2.1.

DETAILED DESCRIPTION OF THE INVENTION

In order to better clarify the purposes, technical solutions and advantages of the examples of the present invention, the technical solutions in the examples of the present invention are clearly and completely described below. Obviously, the examples described herein are just part of the examples of the present invention and are not all the examples. All other exemplary embodiments obtained by one skilled in the art on the basis of the examples in the present invention without performing creative work shall all fall into the scope of protection of the present invention. What needs to be made clear is that, as long as there is no conflict, the examples and the features of examples in the present application can be arbitrarily combined with each other.

The basic concept of the present invention is that the components of the glass fiber composition expressed as percentage by weight are: 55-64% SiO$_2$, 13-24% Al$_2$O$_3$, 0.1-6% Y$_2$O$_3$, 3.4-10.9% CaO, 8-14% MgO, lower than 22% CaO+MgO+SrO, lower than 2% Li$_2$O+Na$_2$O+K$_2$O, lower than 2% TiO$_2$, lower than 1.5% Fe$_2$O$_3$, 0-1.2% La$_2$O$_3$, wherein the range of the weight percentage ratio C1=(Li$_2$O+Na$_2$O+K$_2$O)/(Y$_2$O$_3$+La$_2$O$_3$) is greater than 0.26. Said composition can significantly increase the glass elastic modulus, effectively inhibit the crystallization tendency of glass, decrease the liquidus temperature, secure a desirable temperature range (ΔT) for fiber formation and enhance the fining of molten glass, thus making it particularly suitable for high modulus glass fiber production with refractory-lined furnaces.

The specific content values of $SiO_2$, $Al_2O_3$, $Y_2O_3$, CaO, MgO, $Li_2O$, $Na_2O$, $K_2O$, $Fe_2O_3$, $TiO_2$, SrO and $La_2O_3$ in the glass fiber composition of the present invention are selected to be used in the examples, and comparisons with S glass, traditional R glass and improved R glass are made in terms of the following six property parameters, (1) Forming temperature, the temperature at which the glass melt has a viscosity of $10^3$ poise.

(2) Liquidus temperature, the temperature at which the crystal nucleuses begin to form when the glass melt cools off—i.e., the upper limit temperature for glass crystallization.

(3) ΔT value, which is the difference between the forming temperature and the liquidus temperature and indicates the temperature range at which fiber drawing can be performed.

(4) Peak crystallization temperature, the temperature which corresponds to the strongest peak of glass crystallization during the DTA testing. Generally, the higher this temperature is, the more energy is needed by crystal nucleuses to grow and the lower the glass crystallization tendency is.

(5) Elastic modulus, the linear elastic modulus defining the ability of glass to resist elastic deformation, which is to be measured as per ASTM2343.

(6) Amount of bubbles, to be determined in a procedure set out as follows: Use specific moulds to compress the glass batch materials in each example into samples of same dimension, which will then be placed on the sample platform of a high temperature microscope. Heat the samples according to standard procedures up to the pre-set spatial temperature 1500° C. and then directly cool them off with the cooling hearth of the microscope to the ambient temperature without heat preservation. Finally, each of the glass samples is examined under a polarizing microscope to determine the amount of bubbles in the samples. A bubble is identified according to a specific amplification of the microscope.

The aforementioned six parameters and the methods of measuring them are well-known to one skilled in the art. Therefore, these parameters can be effectively used to explain the properties of the glass fiber composition of the present invention.

The specific procedures for the experiments are as follows: Each component can be acquired from the appropriate raw materials. Mix the raw materials in the appropriate proportions so that each component reaches the final expected weight percentage. The mixed batch melts and the molten glass refines. Then the molten glass is drawn out through the tips of the bushings, thereby forming the glass fiber. The glass fiber is attenuated onto the rotary collet of a winder to form cakes or packages. Of course, conventional methods can be used to deep process these glass fibers to meet the expected requirements.

The exemplary embodiments of the glass fiber composition according to the present invention are given below.

Example 1

| | |
|---|---|
| $SiO_2$ | 59.5% |
| $Al_2O_3$ | 16.7% |
| CaO | 8.9% |
| MgO | 9.5% |
| $Y_2O_3$ | 1.8% |

-continued

| | |
|---|---|
| $Na_2O$ | 0.23% |
| $K_2O$ | 0.36% |
| $Li_2O$ | 0.75% |
| $Fe_2O_3$ | 0.44% |
| $TiO_2$ | 0.43% |
| SrO | 1.0% |

In addition, the weight percentage ratio $C1=(Li_2O+Na_2O+K_2O)/Y_2O_3$ is 0.74, and the weight percentage ratio $C2=MgO/(CaO+SrO)$ is 0.96.

In Example 1, the measured values of the six parameters are respectively:

| | |
|---|---|
| Forming temperature | 1298° C. |
| Liquidus temperature | 1205° C. |
| ΔT | 93° C. |
| Peak crystallization temperature | 1023° C. |
| Elastic modulus | 93.9 GPa |
| Amount of bubbles | 11 |

Example 2

| | |
|---|---|
| $SiO_2$ | 59.3% |
| $Al_2O_3$ | 17.0% |
| CaO | 8.2% |
| MgO | 9.7% |
| $Y_2O_3$ | 3.3% |
| $Na_2O$ | 0.22% |
| $K_2O$ | 0.37% |
| $Li_2O$ | 0.75% |
| $Fe_2O_3$ | 0.44% |
| $TiO_2$ | 0.44% |

In addition, the weight percentage ratio $C1=(Li_2O+Na_2O+K_2O)/Y_2O_3$ is 0.41, and the weight percentage ratio $C2=MgO/(CaO+SrO)$ is 1.18.

In Example 2, the measured values of the six parameters are respectively:

| | |
|---|---|
| Forming temperature | 1300° C. |
| Liquidus temperature | 1206° C. |
| ΔT | 94° C. |
| Peak crystallization temperature | 1024° C. |
| Elastic modulus | 95.6 GPa |
| Amount of bubbles | 8 |

Example 3

| | |
|---|---|
| $SiO_2$ | 58.2% |
| $Al_2O_3$ | 19.2% |
| CaO | 6.7% |
| MgO | 10% |
| $Y_2O_3$ | 3.4% |
| $Na_2O$ | 0.19% |
| $K_2O$ | 0.23% |
| $Li_2O$ | 0.55% |
| $Fe_2O_3$ | 0.44% |
| $TiO_2$ | 0.82% |

In addition, the weight percentage ratio $C1=(Li_2O+Na_2O+K_2O)/Y_2O_3$ is 0.29, and the weight percentage ratio $C2=MgO/(CaO+SrO)$ is 1.49.

In Example 3, the measured values of the six parameters are respectively:

| Forming temperature | 1305° C. |
|---|---|
| Liquidus temperature | 1200° C. |
| ΔT | 105° C. |
| Peak crystallization temperature | 1024° C. |
| Elastic modulus | 97.0 GPa |
| Amount of bubbles | 11 |

Example 4

| $SiO_2$ | 58.8% |
|---|---|
| $Al_2O_3$ | 17.4% |
| CaO | 5.8% |
| MgO | 10.4% |
| $Y_2O_3$ | 5.0% |
| $Na_2O$ | 0.29% |
| $K_2O$ | 0.49% |
| $Li_2O$ | 0.75% |
| $Fe_2O_3$ | 0.43% |
| $TiO_2$ | 0.40% |

In addition, the weight percentage ratio C1=($Li_2O$+$Na_2O$+$K_2O$)/$Y_2O_3$ is 0.31, and the weight percentage ratio C2=MgO/(CaO+SrO) is 1.79.

In Example 4, the measured values of the six parameters are respectively:

| Forming temperature | 1303° C. |
|---|---|
| Liquidus temperature | 1213° C. |
| ΔT | 90° C. |
| Peak crystallization temperature | 1029° C. |
| Elastic modulus | 100.3 GPa |
| Amount of bubbles | 9 |

Example 5

| $SiO_2$ | 59.3% |
|---|---|
| $Al_2O_3$ | 17.1% |
| CaO | 7.6% |
| MgO | 10.4% |
| $Y_2O_3$ | 3.1% |
| $Na_2O$ | 0.21% |
| $K_2O$ | 0.34% |
| $Li_2O$ | 0.45% |
| $Fe_2O_3$ | 0.44% |
| $TiO_2$ | 0.43% |
| SrO | 0.3% |

In addition, the weight percentage ratio C1=($Li_2O$+$Na_2O$+$K_2O$)/$Y_2O_3$ is 0.32, and the weight percentage ratio C2=MgO/(CaO+SrO) is 1.37.

In Example 5, the measured values of the six parameters are respectively:

| Forming temperature | 1296° C. |
|---|---|
| Liquidus temperature | 1206° C. |
| ΔT | 90° C. |
| Peak crystallization temperature | 1021° C. |
| Elastic modulus | 94.1 GPa |
| Amount of bubbles | 10 |

Example 6

| $SiO_2$ | 59.3% |
|---|---|
| $Al_2O_3$ | 16.3% |
| CaO | 6.1% |
| MgO | 12.2% |
| $Y_2O_3$ | 3.4% |
| $Na_2O$ | 0.23% |
| $K_2O$ | 0.46% |
| $Li_2O$ | 0.50% |
| $Fe_2O_3$ | 0.44% |
| $TiO_2$ | 0.82% |

In addition, the weight percentage ratio C1=($Li_2O$+$Na_2O$+$K_2O$)/$Y_2O_3$ is 0.35, and the weight percentage ratio C2=MgO/(CaO+SrO) is 2.

In Example 6, the measured values of the six parameters are respectively:

| Forming temperature | 1300° C. |
|---|---|
| Liquidus temperature | 1220° C. |
| ΔT | 80° C. |
| Peak crystallization temperature | 1020° C. |
| Elastic modulus | 97.1 GPa |
| Amount of bubbles | 10 |

Comparisons of the property parameters of the aforementioned examples and other examples of the glass fiber composition of the present invention with those of traditional E glass, traditional R glass and improved R glass are further made below by way of tables, wherein the component contents of the glass fiber composition are expressed as weight percentage. What needs to be made clear is that the total amount of the components in the examples is slightly less than 100%, and it should be understood that the remaining amount is trace impurities or a small amount of components which cannot be analyzed.

TABLE 1A

| | | A1 | A2 | A3 | A4 | A5 | A6 | A7 |
|---|---|---|---|---|---|---|---|---|
| Component | $SiO_2$ | 59.4 | 59.3 | 59.5 | 59.4 | 60.1 | 58.2 | 59.3 |
| | $Al_2O_3$ | 16.9 | 17.1 | 16.6 | 16.7 | 17.0 | 19.2 | 16.3 |
| | CaO | 7.8 | 7.6 | 7.3 | 9.7 | 10.2 | 6.7 | 6.1 |
| | MgO | 9.6 | 10.4 | 10.0 | 9.4 | 9.8 | 10.0 | 12.2 |
| | $Y_2O_3$ | 3.1 | 3.1 | 3.1 | 2.4 | 0.5 | 3.4 | 3.4 |
| | $Na_2O$ | 0.21 | 0.21 | 0.21 | 0.23 | 0.21 | 0.19 | 0.23 |
| | $K_2O$ | 0.42 | 0.34 | 0.51 | 0.38 | 0.41 | 0.23 | 0.46 |
| | $Li_2O$ | 0.71 | 0.45 | 0.60 | 0.70 | 0.65 | 0.55 | 0.50 |
| | $Fe_2O_3$ | 0.44 | 0.44 | 0.44 | 0.44 | 0.44 | 0.44 | 0.44 |
| | $TiO_2$ | 0.43 | 0.43 | 0.37 | 0.42 | 0.44 | 0.82 | 0.82 |
| | SrO | 0.7 | 0.3 | 1.1 | — | — | — | — |

TABLE 1A-continued

|  |  | A1 | A2 | A3 | A4 | A5 | A6 | A7 |
|---|---|---|---|---|---|---|---|---|
| Ratio | C1 | 0.43 | 0.32 | 0.43 | 0.55 | 2.54 | 0.29 | 0.35 |
|  | C2 | 1.13 | 1.37 | 1.19 | 0.97 | 0.96 | 1.49 | 2 |
| Parameter | Forming temperature/° C. | 1294 | 1296 | 1295 | 1298 | 1300 | 1305 | 1300 |
|  | Liquidus temperature/° C. | 1202 | 1206 | 1199 | 1200 | 1208 | 1200 | 1220 |
|  | ΔT/° C. | 92 | 90 | 96 | 98 | 92 | 105 | 80 |
|  | Peak crystallization temperature/° C. | 1023 | 1021 | 1025 | 1022 | 1018 | 1024 | 1020 |
|  | Elastic modulus/GPa | 95.0 | 94.1 | 95.8 | 93.3 | 90.9 | 97.0 | 97.1 |
|  | Amount of bubbles/pcs | 9 | 10 | 11 | 10 | 12 | 11 | 10 |

TABLE 1B

|  |  | A8 | A9 | A10 | A11 | A12 | A13 | A14 |
|---|---|---|---|---|---|---|---|---|
| Component | $SiO_2$ | 59.1 | 59.1 | 59.3 | 59.4 | 59.1 | 60.4 | 61.0 |
|  | $Al_2O_3$ | 16.9 | 17.0 | 16.8 | 16.7 | 16.8 | 16.7 | 16.2 |
|  | CaO | 6.8 | 6.9 | 10.0 | 9.0 | 9.9 | 9.2 | 8.5 |
|  | MgO | 10.8 | 10.8 | 9.8 | 9.4 | 9.3 | 9.7 | 9.7 |
|  | $Y_2O_3$ | 3.7 | 3.7 | 2.0 | 3.0 | 3.0 | 0.5 | 0.9 |
|  | $Na_2O$ | 0.21 | 0.23 | 0.21 | 0.32 | 0.21 | 0.21 | 0.21 |
|  | $K_2O$ | 0.42 | 0.36 | 0.32 | 0.58 | 0.39 | 0.43 | 0.43 |
|  | $Li_2O$ | 0.61 | 0.41 | 0.37 | 0.45 | 0.20 | 0.75 | 0.75 |
|  | $Fe_2O_3$ | 0.44 | 0.44 | 0.44 | 0.44 | 0.44 | 0.44 | 0.44 |
|  | $TiO_2$ | 0.43 | 0.43 | 0.42 | 0.42 | 0.42 | 0.44 | 0.42 |
|  | SrO | 0.3 | 0.3 | — | — | — | — | — |
|  | $La_2O_3$ | — | — | — | — | — | 1 | 1.2 |
| Ratio | C1 | 0.34 | 0.27 | 0.45 | 0.45 | 0.27 | 0.93 | 0.66 |
|  | C2 | 1.52 | 1.50 | 0.98 | 1.04 | 0.94 | 1.05 | 1.14 |
| Parameter | Forming temperature/° C. | 1295 | 1297 | 1292 | 1297 | 1296 | 1296 | 1302 |
|  | Liquidus temperature/° C. | 1206 | 1212 | 1204 | 1202 | 1206 | 1205 | 1203 |
|  | ΔT/° C. | 89 | 85 | 88 | 95 | 90 | 91 | 100 |
|  | Peak crystallization temperature/° C. | 1028 | 1026 | 1020 | 1023 | 1021 | 1020 | 1023 |
|  | Elastic modulus/GPa | 97.1 | 95.7 | 92.9 | 94.3 | 93.5 | 91.2 | 92.1 |
|  | Amount of bubbles/pcs | 8 | 9 | 10 | 9 | 10 | 6 | 5 |

TABLE 1C

|  |  | A15 | A16 | A17 | A18 | S glass | Traditional R glass | Improved R glass |
|---|---|---|---|---|---|---|---|---|
| Component | $SiO_2$ | 58.8 | 59.7 | 59.5 | 59.3 | 65 | 60 | 60.75 |
|  | $Al_2O_3$ | 17.4 | 16.8 | 16.7 | 17.0 | 25 | 25 | 15.80 |
|  | CaO | 5.8 | 10.1 | 8.9 | 8.2 | — | 9 | 13.90 |
|  | MgO | 10.4 | 9.3 | 9.5 | 9.7 | 10 | 6 | 7.90 |
|  | $Y_2O_3$ | 5.0 | 1.6 | 1.8 | 3.3 | — | — | — |
|  | $Na_2O$ | 0.29 | 0.22 | 0.23 | 0.22 | trace amount | trace amount | 0.73 |
|  | $K_2O$ | 0.49 | 0.38 | 0.36 | 0.37 | trace amount | trace amount |  |
|  | $Li_2O$ | 0.75 | 0.75 | 0.75 | 0.75 | — | — | 0.48 |
|  | $Fe_2O_3$ | 0.43 | 0.44 | 0.44 | 0.44 | trace amount | trace amount | 0.18 |

TABLE 1C-continued

|  |  | A15 | A16 | A17 | A18 | S glass | Traditional R glass | Improved R glass |
|---|---|---|---|---|---|---|---|---|
|  | TiO$_2$ | 0.40 | 0.43 | 0.43 | 0.44 | trace amount | trace amount | 0.12 |
|  | SrO | — | — | 1.0 | — | — | — | — |
| Ratio | C1 | 0.31 | 0.84 | 0.74 | 0.41 | — | — | — |
|  | C2 | 1.79 | 0.92 | 0.96 | 1.18 | — | 0.67 | 0.57 |
| Parameter | Forming temperature/° C. | 1303 | 1299 | 1298 | 1300 | 1571 | 1430 | 1278 |
|  | Liquidus temperature/° C. | 1213 | 1210 | 1205 | 1206 | 1470 | 1350 | 1210 |
|  | ΔT/° C. | 90 | 89 | 93 | 94 | 101 | 80 | 68 |
|  | Peak crystallization temperature/° C. | 1029 | 1021 | 1023 | 1024 | — | 1010 | 1016 |
|  | Elastic modulus/GPa | 100.3 | 93.0 | 93.9 | 95.6 | 89 | 88 | 87 |
|  | Amount of bubbles/pcs | 9 | 10 | 11 | 8 | 40 | 30 | 25 |

It can be seen from the values in the above tables that, compared with the S glass and traditional R glass, the glass fiber composition of the present invention has the following advantages: (1) much higher elastic modulus; (2) much lower liquidus temperature, which helps to reduce crystallization risk and increase the fiber drawing efficiency; relatively high peak crystallization temperature, which indicates that more energy is needed for the formation and growth of crystal nucleuses during the crystallization process of glass, i.e. the crystallization risk of the glass of the present invention is smaller under the same conditions; (3) smaller amount of bubbles, which indicates a better refining of molten glass.

Both S glass and traditional R glass cannot enable the achievement of large-scale production with refractory-lined furnaces and, with respect to improved R glass, part of the glass properties is compromised to reduce the liquidus temperature and forming temperature, so that the production difficulty is decreased and the production with refractory-lined furnaces could be achieved. By contrast, the glass fiber composition of the present invention not only has a sufficiently low liquidus temperature and forming temperature which permit the production with refractory-lined furnaces, but also significantly increases the glass modulus, thereby resolving the technical bottleneck that the modulus of S glass fiber and R glass fiber cannot be improved with the growth of production scale.

The glass fiber composition according to the present invention can be used for making glass fibers having the aforementioned excellent properties.

The glass fiber composition according to the present invention in combination with one or more organic and/or inorganic materials can be used for preparing composite materials having excellent performances, such as glass fiber reinforced base materials.

Finally, what should be made clear is that, in this text, the terms "contain", "comprise" or any other variants are intended to mean "nonexclusively include" so that any process, method, article or equipment that contains a series of factors shall include not only such factors, but also include other factors that are not explicitly listed, or also include intrinsic factors of such process, method, object or equipment. Without more limitations, factors defined by such phrase as "contain a . . . " do not rule out that there are other same factors in the process, method, article or equipment which include said factors.

The above examples are provided only for the purpose of illustrating instead of limiting the technical solutions of the present invention. Although the present invention is described in details by way of aforementioned examples, one skilled in the art shall understand that modifications can also be made to the technical solutions embodied by all the aforementioned examples or equivalent replacement can be made to some of the technical features. However, such modifications or replacements will not cause the resulting technical solutions to substantially deviate from the spirits and ranges of the technical solutions respectively embodied by the examples of the present invention.

INDUSTRIAL APPLICABILITY OF THE INVENTION

The glass fiber composition of the present invention not only has a sufficiently low liquidus temperature and forming temperature which enable the production with refractory-lined furnaces, but also significantly increases the glass modulus, thereby resolving the technical bottleneck that the modulus of S glass fiber and R glass fiber cannot be improved with the enhanced production scale. Compared with the current main-stream high-modulus glasses, the glass fiber composition of the present invention has made a breakthrough in terms of elastic modulus, crystallization performance and fining performance of the glass, with significantly improved modulus, remarkably reduced crystallization risk and relatively small amount of bubbles under the same conditions. Thus, the overall technical solution of the present invention enables an easy achievement of large-scale production with refractory-lined furnaces.

The invention claimed is:

1. A high-modulus glass fiber composition, comprising the following components expressed as percentage by weight:

| | |
|---|---|
| SiO$_2$ | 55-64% |
| Al$_2$O$_3$ | 16.8-24% |
| Y$_2$O$_3$ | 3-6% |
| CaO | 3.4-9.9% |

-continued

| | |
|---|---|
| MgO | 9.3-14% |
| CaO + MgO + SrO | <22% |
| Li$_2$O + Na$_2$O + K$_2$O | <2% |
| TiO$_2$ | <2% |
| Fe$_2$O$_3$ | <1.5% |
| La$_2$O$_3$ | 0-1.2% | wherein, the range of the weight percentage ratio C1=(Li$_2$O+Na$_2$O+K$_2$O)/(Y$_2$O$_3$+La$_2$O$_3$) is greater than 0.26.

2. The high-modulus glass fiber composition according to claim 1, wherein the range of the weight percentage ratio C2=MgO/(CaO+SrO) is 0.8-2.1.

3. The high-modulus glass fiber composition according to claim 1, comprising the following components expressed as percentage by weight:

| | |
|---|---|
| SiO$_2$ | 56-60.4% |
| Al$_2$O$_3$ | 16.8-24% |
| Y$_2$O$_3$ | 3-6% |
| CaO | 3.4-9.9% |
| MgO | 9.3-14% |
| CaO + MgO + SrO | <22% |
| SrO | <3% |
| Li$_2$O + Na$_2$O + K$_2$O | <2% |
| TiO$_2$ | <2% |
| Fe$_2$O$_3$ | <1.5% |
| La$_2$O$_3$ | 0-1.2% | wherein, the range of the weight percentage ratio C1=(Li$_2$O+Na$_2$O+K$_2$O)/(Y$_2$O$_3$+La$_2$O$_3$) is greater than 0.26.

4. The high-modulus glass fiber composition according to claim 1, comprising the following components expressed as percentage by weight:

| | |
|---|---|
| SiO$_2$ | 56-60.4% |
| Al$_2$O$_3$ | 16.8-24% |
| Y$_2$O$_3$ | 3-5% |
| CaO | 3.4-9.9% |
| MgO | 9.3-14% |
| CaO + MgO + SrO | <22% |
| SrO | <3% |
| Li$_2$O | 0.1-1.5% |
| Li$_2$O + Na$_2$O + K$_2$O | <2% |
| TiO$_2$ | <2% |
| Fe$_2$O$_3$ | <1.5% |
| La$_2$O$_3$ | 0-1.2% | wherein, the range of the weight percentage ratio C1=(Li$_2$O+Na$_2$O+K$_2$O)/(Y$_2$O$_3$+La$_2$O$_3$) is greater than 0.26, and the weight percentage ratio C2=MgO/(CaO+SrO) is 0.8-2.1.

5. The high-modulus glass fiber composition according to claim 1, comprising the following components expressed as percentage by weight:

| | |
|---|---|
| SiO$_2$ | 56-60.4% |
| Al$_2$O$_3$ | 16.8-24% |
| Y$_2$O$_3$ | 3-5% |
| CaO | 3.4-9.9% |
| MgO | 9.3-14% |
| CaO + MgO + SrO | <22% |
| SrO | <3% |
| Li$_2$O | 0.1-1.5% |
| Li$_2$O + Na$_2$O + K$_2$O | <2% |
| TiO$_2$ | <2% |
| Fe$_2$O$_3$ | <1.5% |
| La$_2$O$_3$ | 0-1.2% | wherein, the range of the weight percentage ratio C1=(Li$_2$O+Na$_2$O+K$_2$O)/(Y$_2$O$_3$+La$_2$O$_3$) is greater than 0.28, and the weight percentage ratio C2=MgO/(CaO+SrO) is 0.8-2.1.

6. The high-modulus glass fiber composition according to claim 1, comprising the following components expressed as percentage by weight:

| | |
|---|---|
| SiO$_2$ | 57-60.4% |
| Al$_2$O$_3$ | 16.8-24% |
| Y$_2$O$_3$ | 3-5% |
| CaO | 5-9.9% |
| MgO | 9.3-14% |
| CaO + MgO + SrO | <21% |
| SrO | <3% |
| Li$_2$O | 0.1-1% |
| Li$_2$O + Na$_2$O + K$_2$O | <2% |
| TiO$_2$ | <2% |
| Fe$_2$O$_3$ | <1.5% |
| La$_2$O$_3$ | 0-1.2% | wherein, the range of the weight percentage ratio C1=(Li$_2$O+Na$_2$O+K$_2$O)/(Y$_2$O$_3$+La$_2$O$_3$) is greater than 0.28, and the weight percentage ratio C2=MgO/(CaO+SrO) is 0.8-2.1.

7. The high-modulus glass fiber composition according to claim 1, comprising the following components expressed as percentage by weight:

| | |
|---|---|
| SiO$_2$ | 57-60.4% |
| Al$_2$O$_3$ | 16.8-23% |
| Y$_2$O$_3$ | 3-5% |
| CaO | 6-9.9% |
| MgO | 9.3-13% |
| CaO + MgO + SrO | <21% |
| SrO | <3% |
| Li$_2$O | 0.1-1% |
| Li$_2$O + Na$_2$O + K$_2$O | <2% |
| TiO$_2$ | <2% |
| Fe$_2$O$_3$ | <1.5% |
| La$_2$O$_3$ | 0-1.2% | wherein, the range of the weight percentage ratio C1=(Li$_2$O+Na$_2$O+K$_2$O)/(Y$_2$O$_3$+O$_3$) is greater than 0.29, and the weight percentage ratio C2=MgO/(CaO+SrO) is 0.9-1.8.

8. The high-modulus glass fiber composition according to claim 1, comprising the following components expressed as percentage by weight:

| | |
|---|---|
| SiO$_2$ | 57-60.4% |
| Al$_2$O$_3$ | 16.8-23% |
| Y$_2$O$_3$ | 3-5% |
| CaO | 6-9.9% |
| MgO | 9.3-13% |
| CaO + MgO + SrO | <21% |
| SrO | <3% |
| Li$_2$O | 0.1-1% |
| Li$_2$O + Na$_2$O + K$_2$O | <2% |
| TiO$_2$ | <2% |
| Fe$_2$O$_3$ | <1.5% |
| La$_2$O$_3$ | 0-1.2% | wherein, the range of the weight percentage ratio C1=$(Li_2O+Na_2O+K_2O)/(Y_2O_3+La_2O_3)$ is greater than 0.29, and the weight percentage ratio C2=$MgO/(CaO+SrO)$ is 0.9-1.7.

9. The high-modulus glass fiber composition according to claim 1, comprising the following components expressed as percentage by weight:

| | |
|---|---|
| $SiO_2$ | 55-64% |
| $Al_2O_3$ | greater than 19% and not greater than 21% |
| $Y_2O_3$ | 3-6% |
| CaO | 3.4-9.9% |
| MgO | 9.3-10.5% |
| CaO + MgO + SrO | <22% |
| $Li_2O$ + $Na_2O$ + $K_2O$ | ≤1% |
| $TiO_2$ | <2% |
| $Fe_2O_3$ | <1.5% |
| $La_2O_3$ | 0-1.2% | wherein, the range of the weight percentage ratio C1=$(Li_2O+Na_2O+K_2O)/(Y_2O_3+La_2O_3)$ is greater than 0.26.

10. The high-modulus glass fiber composition according to claim 1, wherein the content range of $Li_2O$ by weight is 0.1-1.5%.

11. The high-modulus glass fiber composition according to claim 1, wherein the content range of SrO by weight is 0.1-2.5%.

12. The high-modulus glass fiber composition according to claim 1, wherein the content range of CaO by weight is 6-9.9%.

13. The high-modulus glass fiber composition according to claim 1, wherein the content range of MgO by weight is 9.38-13%.

14. The high-modulus glass fiber composition according to claim 1, wherein the content range of MgO by weight is greater than 12% and not greater than 13%.

15. The high-modulus glass fiber composition according to claim 2, wherein the content range of $Y_2O_3$ by weight is 39.5-5%.

16. The high-modulus glass fiber composition according to claim 1, wherein the content range of $La_2O_3$ by weight is 0.1-1%.

17. The high-modulus glass fiber composition according to claim 1, comprising CeO2 with the weight percentage of 0-1%.

18. A glass fiber produced from the glass fiber composition described in claim 1.

19. The glass fiber according to claim 18 having the range of the elastic modulus 90-103 GPa.

20. A composite material incorporating the glass fiber described in claim 18.

* * * * *